INVENTOR.
WALTER E. STEWART
BY
Meyer, Baldwin, Doran & Egan
ATTORNEYS

United States Patent Office 3,132,871
Patented May 12, 1964

3,132,871
CHUCK
Walter E. Stewart, Shaker Heights, Ohio, assignor, by mesne assignments, to Rubbermaid Incorporated, Wooster, Ohio, a corporation of Ohio
Filed Oct. 9, 1961, Ser. No. 143,695
2 Claims. (Cl. 279—49)

This invention relates to improvements in a chuck and more particularly to a collet chuck.

One of the objects of the present invention is to provide a collet chuck particularly meeting the requirement of holding a tool securely when the tool is subjected to rotational drive against resistance and simultaneously to high frequency axial impact wherein the collet touching portions, including a member adapted to transmit through compressive relationship the axially applied impact to the end of the tool, do not relatively rotate during rotation of the chuck parts between collet open and closed positions.

A further object of the present invention is to provide a collet chuck especially adapted to be used for carrying the cutting drill in a rotary and percussive (impact) type tool.

A further object of the present invention is to provide a collet chuck adapted to hold a drill shank of minimum length, constructed for easy and simple adjustment, and preferably having a drill end thrust receiving surface which conforms in shape with the end of the drill held in the chuck and so distributes the thrust or impact force over a maximum area, thus reducing wear of the surface.

Another object of the invention is to provide a chuck which normaly can be securely tightened and loosened by hand without need for auxiliary tools such as wrenches, keys or pins.

A further object is to provide a means of securely mounting the chuck onto the spindle of the drill without recourse to thread binding devices such as sealants, lockwashers, etc.

A further object of the present invention is to provide a collet chuck either having ball bearing adjustment action or having a minimum number of component parts.

A further object of the present invention is to provide a chuck characterized by its inexpensive manufacturing cost, ease of assembly of its component parts, structural simplicity, strong and sturdy nature, compactness in design, multiplicity of advantages, and ease of adjustment.

Other features of this invention reside in the arrangement and design of the parts for carrying out their appropriate functions.

Other objects and advantages of this invention will be apparent from the accompanying drawings and description and the essential features will be set forth in the appended claims.

In the drawings—

FIG. 3 is a longitudinal sectional view of another form of collet chuck attached to a rotary and percussive tool shown in dot dash lines; while

Before the collet chucks here illustrated are specifically described, it is to be understood that the invention here involved is not limited to the structural details or arrangement of parts here shown since collet chucks embodying the present invention may take various forms. It also is to be understood that the phraseology or terminology herein employed is for purposes of description and not of limitation since the scope of the present invention is denoted by the appended claims.

Two different forms of collet chucks 20 and 30 are disclosed herein with each being suitable for use in any rotary tool, and being especially adapted for use in a rotary and percussive tool 10 or 11 having respectively power driven end 10A or 11A rotated and axially reciprocated in any suitable manner. For example, the chuck in FIG. 1, or the chuck in FIG. 3 after suitable modification of the driving shank, could be used in many drills or rotary and percussive (impact) type tools.

Figure 1:
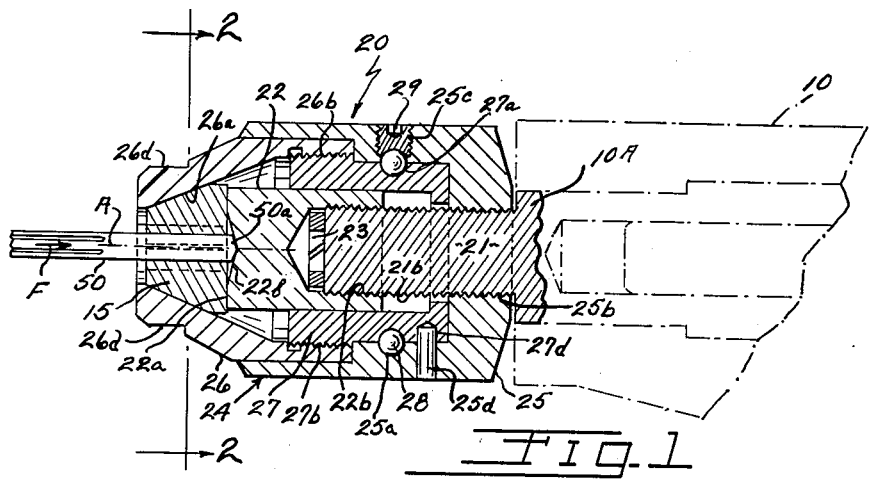
FIG. 1 is a longitudinal sectional view of one form of collet chuck attached to the end of a rotary and percussive tool shown in dot dash lines.
Figure 3:
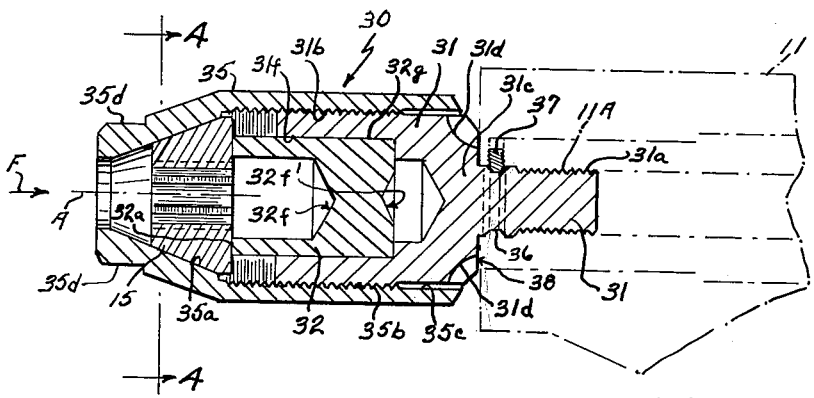

Chuck 20 in FIG. 1 has a shank or chuck drive part 21 integrally formed with power driven tool end 10A, and chuck 30 in FIG. 3 has a shank or chuck drive part 31 screwed into a threaded bore in power driven tool end 11A. However, it should be apparent that either chuck may use either type of attachment to the tool and still be within the scope of the present invention. For example, the right hand portion of part 21 may be secured by a threaded connection to power driven end 10A in the manner shown in FIG. 3, and drive parts 31 may be integrally secured to power drive end 11A in the manner shown in FIG. 1.

These collet chucks 20 and 30 each may use any type of collect movable between an open position and a closed position by differential axial and closing pressures applied thereto. One suitable form of collet is shown in the A. M. Stoner U.S. patent No. 2,346,706, issued April 18, 1944, and entitled "Collet." Here, collet 15 has a plurality of metal wedges 16 and rubber or other elastomer wedges 17 alternating around a circle about a collet axis A, and connected together by a bonded connection to form a generally annular collet.

Each of the chucks 20 and 30 may use interchangeably a plurality of different size collets 15 with each having a different bore size range to hold a different drill size range. For example, two different collets may be used to cover the bore size range from 3/16 to 1/2 inch.

Figure 2:
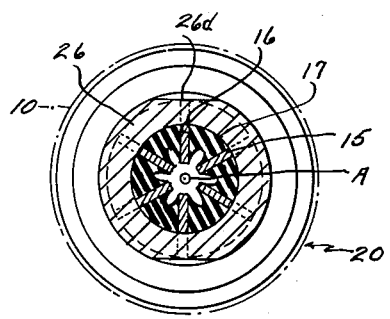
FIG. 2 is a transverse sectional view taken generally along the line 2—2 in FIG. 1 through the chuck with the collet in closed position.

Collet chuck 20 in FIGS. 1 and 2 has a plurality of interconnected parts including chuck drive part 21; thrust block or thrust part 22 located axially between drive part 21 and collet 15 and having a collet touching, axial thrust surface portion 22a; a split lock washer part 23 locking parts 21 and 22 together by threads 21b and 22b on parts 21 and 22 respectively; and barrel assembly 24 connecting collet-touching, conical surface portion 26a and drive part 21 by some of the parts of the chuck. Barrel assembly 24 includes barrel part 25 threaded to drive part 21 by engagement of threads 25b and 21b on the respective parts 25 and 21; nose part 26 having conical surface portion 26a and threads 26b; retainer part 27 secured to nose part 26 by interengaged threads 27b and 26b respectively on parts 27 and 26; a plurality of ball bearings or ball bearng parts 28 of any suitable number, such as twenty-two in one form, located in annular ball races 27a and 25a in parts 27 and 25 respectively with these ball bearings 28 operatively connecting parts 25 and 27 for permitting relative rotation therebetween but for preventing relative endwise movement therebetween; and Allen head set screw 29 screwed into threaded hole 25c in part 25 which serves as a detachable covering for permitting assembly therethrough of ball bearings 28 into the annular raceway 25a, 27a located between parts 25 and 27.

It is easy to change collets 15 in chuck 20 so that new collet 15 covers a different tool shank size range. Retainer part 27 and barrel part 25 are held against relative rotational movement by radially inserting a pin, such as the shank of a drill bit, through radially aligned holes 25d and 27d in these parts. Then, nose part 26 may be rotated by hand, or by a suitable wrench applied to flats 26d, until threads 26b and 27b disengage so that part 26 may be removed. Then, collet 15 may be removed and a different sized collet 15 placed in position before reassembly of chuck 20 in the reverse of this described manner. Parts 26 and 27 are made in two pieces to permit assembly of chuck 20 and to permit changing collets 15 without necessity for general disassembly of the chuck.

Chuck 20 can be completely disassembled. After nose part 26 is removed in the manner aforedescribed, disassembly of chuck 20 is easily completed in the following steps: (1) remove set screw 29 from threaded hole 25c; (2) point hole 25c downwardly and relatively move the parts until all the ball bearings 28 have dropped out through hole 25c; (3) unscrew thrust part 22 from the end of drive part 21 to remove retainer part 27 from part 21; and (4) unscrew barrel part 25 from drive part 21.

Figure 4:
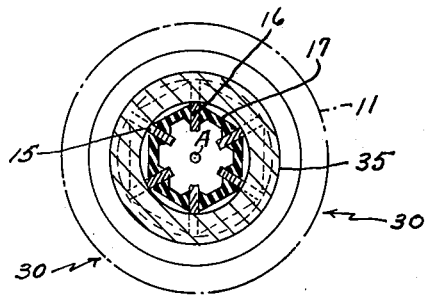
FIG. 4 is a transverse sectional view taken generally along the line 4—4 in FIG. 3 of the collet chuck in the open position.

Collet 30 in FIGS. 3 and 4 includes a plurality of interconnected parts comprising chuck drive part 31 secured to tool driven end 11A by threads 31a, or keyed, tapered or other type connection; part 31 having peripheral threads 31b, a cylindrical portion 31c no larger in diameter than the thread root diameter, and milled slots 31d into which a tool can be inserted for tightening threads 31a onto tool end 11A; thrust block or thrust part 32 located axially between drive part 31 and collet 15, and having a collet-touching axial thrust portion 32a thereon; coaxial bores 31f and 32g in parts 31 and 32 respectively providing together with grease reservoir 31f a lubricated engagement between parts 31 and 32 for permitting relative rotational movement between these parts about collet axis A while moving collet 15 between open and closed positions by having bore 32g lubricated from reservoir 31f; and a barrel assembly having a one-piece barrel part 35 connecting collet-touching conical surface portion 35a thereon and drive part 31 by engagement of threads 35b and 31b.

The direction of rotation when drilling will tend to tighten the threads 31a which connect the chuck to the driven end 11A. On the other hand, this threaded connection 31a would tend to come unscrewed when the driven end is decelerating and rotation of the chuck is not being resisted, or when the driven end is stationary and the chuck is being turned oppositely to the drilling direction, as when unchucking a drill. This undesired unthreading action of threads 31a may be prevented by using a thread binding material on the threads 31a. This creates a difficulty in removing the chuck when it is desired to do so. A preferred answer to this problem is seen in FIG. 3 where a radially-outwardly-opening channel 36 is provided circumferentially around the chuck shank 31 and a set screw 37 engages in this channel and has a threaded connection through one wall of the driven end 11A of the power source. This provides a positive retention of the chuck to the driven end connection, yet one which may easily be disengaged when so desired. Additionally, the shoulder 38 where the members 31 and 11A abut, may be manufactured as close-fitting mating surfaces, and in this way one may provide for more precise axial alignment than is attainable with a threaded connection only.

Part 35 has bore 35c, having a diameter at least as great as the root diameter of threads 35b, so that it will pass freely over the threads 31b and is long enough so that threads 31b are always protected and not exposed during chuck usage.

Collet 15 may be changed and replaced in chuck 30 by another collet 15 after barrel part 35 is removed from drive part 31 by relative rotation of parts 31 and 35. If necessary a suitable tool may be inserted in slots 31d and a wrench or pliers applied to flats 35d to separate parts 31 and 35.

In each of the chucks 20 and 30, the metal wedges 16 of collet 15 are movable radially between open position and closed position by relative rotation of at least some of the chuck parts about collet axis A in one direction to close collet 15 and in the opposite direction to open collet 15. This action is obtained: (1) in chuck 20 by rotating barrel part 25 about axis A while all the other parts 21, 22, 23, 26 and 27 remain stationary; and (2) in chuck 30 by rotating barrel 35, collet 15 and part 32 as a unit above axis A relative to stationary part 31. In each form of chuck, part 26 or part 35 is relatively rotatable about collet central axis A with respect to, and is associated with, the chuck parts having collet touching portions 22a and 26a or 32a and 35a to give them relative axial movement for moving metal wedges 16 of collet 15 radially between open and closed position.

The advantages in chucks 20 and 30 are many. First, in FIG. 3 no rotational scrubbing action takes place over the conical or end surfaces of collet 15 during opening or closing collet movement because no relative rotation between the chuck parts and the collet occurs. In FIG. 1, there is slight rubbing action between collet 15 and member 22 only when tightening or loosening. Collet 15 is locked up with, and non-rotatable with respect to, collet touching portions 22a and 26a or 32a and 35a. Therefore, collet 15 has maximum accuracy and long wear life. Furthermore, if rubber wedges 17 in collet 15 are axially extruded when collet 15 is moved to closed position, this rubber 17 will not be worn by relative rotational frictional engagement with the thrust part 22 or 32. Second, thrust part 22 or 32 coacts with the end of the drill shank to provide advantages. These parts respectively have conical recess 22f or 32f in its axial thrust collet engaging portion for engaging the correspondingly shaped, tapered end surface 50a of a drill shank held in collet 15, thus distributing thrust forces over a maximum area, reducing wear of the surface. In FIG. 3, member 32 may be used as shown for long drills, whereby surface 32f is spaced a distance from collet 15 at least equal to the diameter of the drill so as to steady the drill and prevent wobbling. For shorter drills, member 32 may be reversed bringing recess 32f' in engagement with the drill in a position similar to FIG. 1. An axial pushing force F exerted by the tapered end surface 50a of the shank of drill 50 on the collet chuck will be transmitted to the thrust part 22 or 32 and will have no tendency to drive collet metal wedges 16 into and to cause grooving of conical surface portion 26a or 35a, which have a tapered surface decreasing in diameter toward the left in FIGS. 1 or 3 toward the mouth of the collet chuck. This surface of conical recess 22f or 32f helps center the drill in the chuck and helps turn the drill 50 and distributes the axial hammer blows from tool part 10A or 11A onto drill 50. Thrust parts 22 and 32 are easily replaceable parts after their recesses become badly worn. Third, generally no special tools are required to adjust the chucks but under some conditions it may be found desirable to employ wrenches on flats 26d or 35d, or a tool in slots 31d. Fourth, a minimum axial length of drill shank is held in collet chuck 20 or 30 because: (1) collet 15 is located close to the chuck mouth; and (2) the nose piece 26 or 35 is axially pulled toward the right as viewed in FIGS. 1 and 3 to move the collet to closed position.

Each of the chucks 20 and 30 have some different advantages. Chuck 20 has the advantage over chuck 30 because of being easier to adjust in opening and closing adjustment of the chuck by: (1) using ball bearing parts 28 and (2) having threads 25b of smaller diameter than threads 35b. Ball bearings 28 also hold parts 25 and 27 in assembled position. Chuck 30 has the advantage over chuck 20 in that it has fewer parts so that it will be less expensive to build.

Various changes in details and arrangement of parts may be made by one skilled in the art without departing from either the spirit of this invention or the scope of the appended claims.

What is claimed is:

1. A collet chuck, comprising a plurality of interconnected parts, at least some of said parts connected for relative rotation, a collet compressible and releasable between open position and closed position, means operatively connecting said parts and collet for compressing and releasing said collet between said position in response to relative rotation in opposite directions of said some parts, said collet including a plurality of elastomer and metal wedges alternating around a circle about a collet axis and connected together to form a generally annular collet, said wedges having a tapered conical surface decreasing in diameter toward the mouth of said chuck, one of said parts being a thrust part having a conical recess in an axial thrust collet engaging portion thereof for engaging the tapered end surface of a drill shank held in said collet, one of said parts having a rigid collet touching conical surface portion engaging the wedges of said collet and having a tapered surface decreasing in diameter toward the mouth of said collet chuck, and friction reducing surfaces between said rotatable parts and said thrust part whereby an axial pushing force exerted by said drill shank on said collet chuck will be transmitted to said thrust part and will have no tendency to drive the wedges of said collet into said conical surface portion.

2. A collet chuck, as set forth in claim 1, with said parts including a chuck drive part, said thrust part located axially between said drive part and said collet, there being a recess in one end of said thrust part complementary in shape to the end of a drill shank held in said collet and positioned to receive said drill shank end, said recess being spaced from said collet a distance greater than the diameter of the drill, whereby to prevent wobbling of the drill, said thrust part having an end opposite to said one end and adapted to abut said collet, there being a second recess in said opposite end complementary in shape to the end of a drill shank held in said collet, and said thrust part being reversible in position to bring said second recess into position to receive a drill shaft end, said second recess being spaced from said collet a distance less than the diameter of the drill.

References Cited in the file of this patent
UNITED STATES PATENTS

| | | |
|---|---|---|
| 2,346,706 | Stoner | Apr. 18, 1944 |
| 2,449,887 | Edel | Sept. 21, 1948 |
| 2,591,287 | Pellar | Apr. 1, 1952 |
| 2,880,007 | Stoner | Mar. 31, 1959 |
| 2,978,250 | Abadjieff | Apr. 4, 1961 |